UNITED STATES PATENT OFFICE.

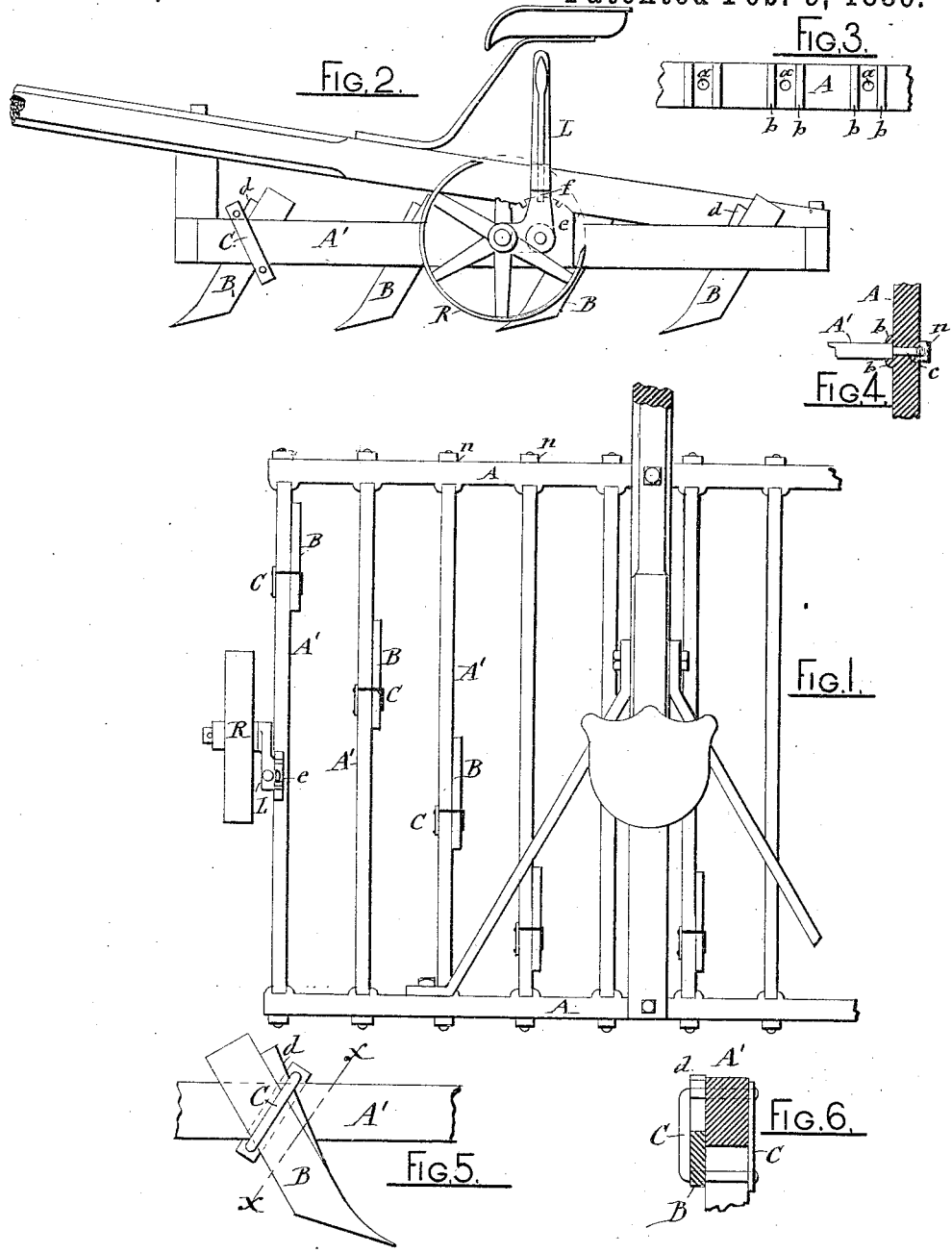

PIERSON JACOBUS, OF VARICK, ASSIGNOR OF ONE-THIRD TO A. BALDRIDGE & CO., OF McDOUGALLS, NEW YORK.

HARROW AND CULTIVATOR.

SPECIFICATION forming part of Letters Patent No. 336,051, dated February 9, 1886.

Application filed June 30, 1885. Serial No. 170,244. (No model.)

*To all whom it may concern:*

Be it known that I, PIERSON JACOBUS, of Varick, in the county of Seneca, in the State of New York, have invented new and useful Improvements in Harrows and Cultivators, of which the following, taken in connection with the accompanying drawings, is a full, clear, and exact description.

The object of my invention is to provide a durable harrow or cultivator frame, made of strong material, so that the pieces need not be large, with projecting braces thereon, the longitudinal bars thereof carrying teeth adapted to be adjusted to any desired point thereon, and said frame having wheels secured to its sides for adjusting the frame up and down, as desired; and it consists in the novel construction hereinafter described, and more particularly pointed out in the claims.

In the annexed drawings, Figure 1 is a plan view of my invention, partly broken away. Fig. 2 is a side elevation of the same, also partly broken away. Fig. 3 is an enlarged detail view of the inner side of one of the cross-bars of the frame. Fig. 4 is an enlarged horizontal sectional view of the connection of the longitudinal bars with the cross-bars of the frame. Fig. 5 is an enlarged side view of one of the teeth and its attachment to the frame; and Fig. 6 is a transverse section on line $x\ x$, Fig. 5.

Similar letters of reference indicate corresponding parts.

The frame, which is adapted for either a harrow or cultivator, is composed of two metal cross-bars, A A, which are each provided with a series of horizontal transverse orifices, $a\ a$, and with vertical cheek-pieces or projecting braces $b\ b$, extending from the plane of the cross-bars at opposite sides of the respective orifices $a\ a$ on the side facing the other of said cross-bars. A series of longitudinal metal bars, A' A', are arranged parallel with the line of draft, and hold the cross-bars at right angles to them, and consequently also at right angles to the line of draft. These longitudinal bars are placed between the cross bars, and extend from one to the other of the latter. The ends of the longitudinal bars are formed with screw-threaded stud-pins $c\ c$, which project through the orifices $a\ a$ of the cross-bars, and are provided at their ends with nuts $n\ n$, by which to tighten the longitudinal bars at the cross-bars. The shoulders of the longitudinal bars immediately back of the stud-pins $c\ c$ thereof rest against the projecting braces $b\ b$, and are thereby prevented from turning on their axis.

B denotes the harrow or cultivator tooth, which I form of a bar of steel which is flat or rectangular in cross-section, pointed on its lower end by a bevel from the rear edge to the front edge, which latter may be either straight, in the shape of a chisel, or slightly curved forward, as shown in Fig. 5 of the drawings. This tooth I place with its flat side against the side of one of the longitudinal bars A' and secure it thereto by a clamp, C, placed diagonally across opposite sides of the tooth and bar A', and embracing the same at their point of crossing, and it may be adjusted to any desired point on the bar. The strain on the tooth when in operation produces a twisting strain on the clamp and causes the same to grip more firmly the bar A' and tooth attached thereto; hence the greater the strain the more secure the attachment of the tooth. By introducing a wedge, $d$, between the edge of the tooth and adjacent part of the clamp I am enabled to regulate the pitch of the tooth.

R R represent the usual gaging-rollers, pivoted on right-angled levers L, which are fulcrumed at their angles on the frame. By swinging said levers the rollers are made to carry the frame at a greater or less elevation, according to the depth of cutting required of the teeth.

Racks $e$ on the frame and dogs F, connected with the levers and engaging said racks, serve to retain the frame at the desired elevation.

My invention possesses the following advantages: First, the frame can be readily taken apart when required to repair or renew any portion thereof; second, the frame, constructed entirely of metal, is strong and durable; third, the attachment of the teeth is simple and effective and self-tightening; fourth, the comparatively thin and flat tooth placed edgewise parallel with the line of draft enables it to operate in hard as well as soft ground; fifth, the construction of the tooth is simple and inexpensive; and, sixth, by drawing the harrow or cultivator backward the beveled edges of the teeth will serve to cut sod.

Having described my invention, what I claim as new, and desire to secure by Letters Patent, is—

1. A harrow or cultivator frame consisting of two parallel cross-bars, one at each end standing at right angles to the line of draft and provided with a series of horizontal transverse orifices and with projecting braces extending from the plane of the cross-bars on opposite sides of the orifices facing those of the other bar, and a series of longitudinal bars on the line of draft, having their ends extending through the orifices of the cross-bars and their shoulders resting on the plane of the bar between the projecting braces, said longitudinal bars carrying adjustable teeth, as and for the purpose set forth.

2. The combination of a harrow or cultivator frame, constructed as described, having teeth adjustable upon the bars of said frame, with a lever and roller and securing device for raising and lowering the implement and fixing it in any desired position, as and for the purpose described.

In testimony whereof I have hereunto signed my name and affixed my seal, in the presence of two attesting witnesses, this 17th day of June, 1885.

PIERSON JACOBUS. [L. S.]

Witnesses:
CHAS. D. BECKER,
ADDISON BALDRIDGE.